Patented July 9, 1946

2,403,438

UNITED STATES PATENT OFFICE 2,403,438

WELDING METHOD

Grover A. Hughes, Seattle, Wash.

No Drawing. Original application September 4, 1940, Serial No. 355,325. Divided and this application June 22, 1943, Serial No. 491,777

2 Claims. (Cl. 219—10)

(Granted under the act of March 3, 1883, as amended April 30, 1928; 370 O. G. 757)

This invention relates to a method of end welding studs by electric arc fusion as disclosed in my copending application Serial Number 355,325, filed September 4, 1940, of which this application is a division.

My method contemplates using studs having a shank and a substantially hemispherical head whereof the diameter is about twice the diameter of the shank. This head serves two useful purposes, viz.: it serves as a heat reservoir to prevent too rapid cooling of the weld, with resulting quenching action due to conduction of heat to the piece to which the stud is welded, and it provides a greater area of bond between the work piece and the stud than can be had if an enlarged head is not used.

When an arc is established between a stud of uniform cross section and a work piece, the stud immediately begins to melt, with resultant decrease in length and increase in arc length. A long arc is not as stable as a short one but tends to wander over a considerable area and the arc flame blows about very rapidly. This action, known as magnetic blow, together with the greater length of the arc affords considerable opportunity for air to come in contact with the metal passing from the stud to the work and with the hot metal in the arc pool or crater. This results in the absorption of oxygen and nitrogen by the hot metal, both of which are detrimental to the quality of the weld. With the stud used in my process, the decrease in length due to fusion is much less.

The curved head presents a relatively small area most closely adjacent to the work piece and hence aids in striking the arc and limits the area of the arc. As the stud melts the area being melted is increased rapidly and since the crater is always greater than that of the electrode, when the stud is thrust into the molten metal in the crater it will fill the crater and will provide a large area of contact between the stud and the work piece over which the bond will form when the metal cools.

As set forth in my said copending application, for welding overhead and to vertical surfaces, such as bulkheads, best results are obtained when the stud is annealed dead soft and is principally of iron with the following elements not exceeding the percentages stated: carbon, 0.09%; manganese, 0.40%; sulphur, 0.04%; phosphorus, 0.04% silicon, 0.02%.

The steps of my method are as follows: The stud is mounted in a suitable welding gun to function as an electrode, the head of the stud is touched to the work piece at the situs of the weld, the current is applied, and the stud withdrawn a short distance to strike an arc. The arc is maintained for a time sufficient to fuse a pool of molten metal in the work piece of area greater than the cross section of the shank of the stud but preferably of less depth than the radius of the head. Of course, if a flush surface is required, the crater may be of sufficient depth to receive the entire head. The head of the stud is then thrust into the pool of molten metal in the crater, the metal permitted to cool.

Welding in the positions specified requires that the heating period be very short to prevent the metal in the molten pool in the crater from running away. With a stud having a hemispherical head I may use very high current value without such decrease in the length of the stud, and consequent increase in arc length, as to be detrimental to the weld. In arc welding studs, the processes follow the laws of bare electrode metal arc welding. High currents mean greater depth of arc crater. When an electrode is cold drawn the arc crater is deep in the work but when the electrode is annealed the penetration of the arc is shallow. I take advantage of this by using annealed studs so the depth of the crater will be small and hence very little metal will be displaced in vertical and overhead welding when the stud is forced into the molten crater to complete the weld.

With a stud of uniform body cross section, any slag inclusions or imperfections reduce the cross sectional area of the weld to less than that of the stud and the full strength of the stud cannot be obtained. However, with my novel stud, the area of the weld will still be greater than the cross sectional area of the body of the stud even though there may be some slag inclusions or other imperfections.

The invention herein described and claimed may be used and/or manufactured by or for the Government of the United States of America for governmental purposes without the payment of any royalties thereon or therefor.

I claim:

1. A method of end-welding to a metal body a stud of dead soft low-carbon steel having a shank and a substantially hemispherical head of greater diameter than said shank, comprising the steps of establishing between the head of said stud and the situs at which it is to be welded an electric arc of suitable strength to effect rapid local fusion of the metal of said body at said situs of a surficial area at least as great as the cross sectional area of said shank but less than the area of the base of said head and to a depth less than the radius of said head, thrusting said head into the said fused metal before said fused metal is gravitationally displaced, and permitting the heated metal to cool, whereby said stud is bonded to said body over an area greater than the said cross sectional area of said shank.

2. A method of end-welding a stud to a metal body at a point of the surface of said body from which molten metal tends to be gravitationally displaced, said stud having a shank and substantially hemispherical head of greater diameter than said shank, comprising the steps of establishing between the head of said stud and the point at which it is to be welded an electric arc of suitable strength to effect rapid local fusion of the metal of said body of a surficial area at least as great as the cross sectional area of said shank but less than the area of the base of said head and to a depth less than the radius of said head, thrusting said head into the said fused metal before said fused metal is gravitationally displaced, and permitting the heated metal to cool, whereby said stud is bonded to said body over an area greater than the said cross sectional area of said shank, said stud being of dead soft low-carbon steel to avoid deep penetration of the fusion into said body.

GROVER A. HUGHES.